United States Patent
Niwa et al.

(10) Patent No.: US 9,470,268 B2
(45) Date of Patent: Oct. 18, 2016

(54) PIVOT ASSEMBLY BEARING DEVICE AND MAGNETIC HEAD ACTUATOR USING THE SAME

(71) Applicants: MINEBEA CO., LTD., Kitasaku-gun, Nagano (JP); THE SCHOOL CORPORATION KANSAI UNIVERSITY, Suita-shi (JP)

(72) Inventors: Shinichi Niwa, Kakegawa (JP); Toshiaki Asakawa, Kakegawa (JP); Shigeyuki Adachi, Fukuroi (JP); Hiroshi Tani, Osaka (JP)

(73) Assignees: MINEBEA CO., LTD., Nagano (JP); THE SCHOOL CORPORATION KANSAI UNIVERSITY, Suita-shi (JP)

( * ) Notice: Subject to any disclaimer, the term of this patent is extended or adjusted under 35 U.S.C. 154(b) by 0 days.

(21) Appl. No.: 14/618,274

(22) Filed: Feb. 10, 2015

(65) Prior Publication Data

US 2015/0233426 A1    Aug. 20, 2015

(30) Foreign Application Priority Data

Feb. 14, 2014   (JP) ................................ 2014-026694

(51) Int. Cl.

| F16C 19/00 | (2006.01) |
|---|---|
| F16C 33/80 | (2006.01) |
| F16C 33/76 | (2006.01) |
| F16C 33/66 | (2006.01) |
| F16C 33/82 | (2006.01) |
| F16C 19/54 | (2006.01) |
| G11B 5/48 | (2006.01) |

(52) U.S. Cl.
CPC ............. *F16C 33/765* (2013.01); *F16C 19/54* (2013.01); *F16C 33/664* (2013.01); *F16C 33/80* (2013.01); *F16C 33/82* (2013.01); *F16C 2370/12* (2013.01); *G11B 5/4813* (2013.01)

(58) Field of Classification Search
CPC .............. F16C 33/6644; F16C 33/746; F16C 33/1035; F16C 33/765; F16C 33/80; F16C 33/82; F16C 2370/12; F16C 19/54; F16C 33/664; F16J 15/43; G11B 5/4813
USPC ......................................... 384/100, 114, 133
See application file for complete search history.

(56) References Cited

U.S. PATENT DOCUMENTS

| 4,692,826 | A | * | 9/1987 | Raj | ....................... F16C 33/765 |
|---|---|---|---|---|---|
| | | | | | 277/410 |
| 4,824,122 | A | * | 4/1989 | Raj | .......................... F16J 15/43 |
| | | | | | 277/410 |
| 5,287,148 | A | * | 2/1994 | Sakemi | ............. G03G 15/0942 |
| | | | | | 399/104 |
| 6,119,553 | A | * | 9/2000 | Yamagishi | .......... F16C 33/6644 |
| | | | | | 277/410 |

(Continued)

FOREIGN PATENT DOCUMENTS

| JP | S58-220275 A | 12/1983 |
|---|---|---|
| JP | 06185527 A | * 7/1994 |

(Continued)

*Primary Examiner* — Adam D Rogers
(74) *Attorney, Agent, or Firm* — Oliff PLC

(57) ABSTRACT

A ball bearing (rolling bearing) containing lubricant sealed therein is provided between a shaft and a sleeve. A labyrinth seal (seal gap) is provided at an end portion of the shaft or the sleeve in the axial direction. A permanent magnet is disposed such that a magnetic pole is located in proximity to the labyrinth seal. A magnetic seal effect that utilizes diamagnetism acting on evaporating oil is provided at the labyrinth seal.

4 Claims, 15 Drawing Sheets

(56) References Cited

U.S. PATENT DOCUMENTS

| | | | |
|---|---|---|---|
| 6,290,233 B1 * | 9/2001 | Yamamura | F16J 15/43 277/410 |
| 6,769,694 B2 * | 8/2004 | Anzai | F16J 15/43 277/410 |
| 8,585,295 B2 * | 11/2013 | Honda | F16J 15/43 277/302 |
| 2007/0029737 A1 * | 2/2007 | Mikhalev | F16J 15/43 277/410 |
| 2008/0116757 A1 * | 5/2008 | Chang | F16C 17/10 310/90.5 |
| 2015/0055250 A1 * | 2/2015 | Tsuchiya | F16C 33/805 360/234.1 |

FOREIGN PATENT DOCUMENTS

| | | | |
|---|---|---|---|
| JP | H11-166526 A | 6/1999 | |
| WO | WO 2015093974 A1 * | 6/2015 | F16J 1/08 |

* cited by examiner

FIG. 12

| Labyrinth Seals 16a/16b | $\partial B^2/\partial y$ | | | |
| --- | --- | --- | --- | --- |
|  | Example 1 | Example 2 | Comparative Example 1 | Comparative Example 2 |
| 16b (Upper side) | 0.028 | 0.010 | 0.002 | 0.0001 |
| 16a (Lower side) | 0.005 | 0.010 | 0.004 | 0.0001 |

PIVOT ASSEMBLY BEARING DEVICE AND MAGNETIC HEAD ACTUATOR USING THE SAME

BACKGROUND OF THE INVENTION

1. Field of the Invention

The present invention relates to a pivot assembly bearing device that prevents diffusion of oil and a magnetic head actuator using the same.

2. Description of Related Art

In a magnetic head actuator for use in a hard disk device or the like, conventionally, a swing arm on which a magnetic head that reads and writes a data is supported by a pivot assembly bearing device including a pair of ball bearings. In the pivot assembly bearing device, lubricant sealed inside the ball bearings is prevented from splashing, leaking out or evaporating in order to avoid contamination or damage of a magnetic disk.

Along with an increase in the capacity of hard disk devices in recent years, the gap between the magnetic head of the magnetic head actuator and the magnetic disk is becoming smaller. Therefore, there is an increasing demand to prevent leakage of lubricant sealed in ball bearings of the pivot assembly bearing device.

Material showing prior art that addresses such a demand can be found in Japanese Patent Application Publication No. 11-166526 (JP 11-166526 A) and Japanese Patent Application Publication No. 58-220275 (JP 58-220275 A).

As a rolling bearing device with two ball bearings, JP 11-166526 A discloses a rolling bearing device for a swing arm (pivot assembly bearing device) including a shield plate on at least one of the axially outer sides of the ball bearings for reducing splashing and leaking out of lubricant.

According to the document, it is possible to provide a swing arm rolling bearing device in which splashing and leaking out of lubricant is reduced.

JP 58-220275 A describes a magnetic head actuator including bearings disposed in an air-tight chamber formed by a magnetic fluid seal, in which evaporating lubricating oil (evaporating oil) coming from the inside of the bearings is hindered from adhering to a magnetic disk.

That is, as illustrated in FIGS. 3 and 4 of JP 58-220275 A, a seal main body of the magnetic fluid seal which surrounds a rotary shaft is disposed between the bearing and a rotator. This seal main body includes a hollow cylindrical base body and two annular end plates attached to both end surfaces of the base body. The inner peripheral edge of the end plate is provided in proximity to the outer periphery of the rotary shaft. A colloidal magnetic fluid obtained by stably dispersing ferromagnetic fine powder in an oil-based solvent is supplied between the inner peripheral edge of the end plate and the outer periphery of the rotary shaft. The magnetic fluid adheres to both the inner peripheral edge of the end plate and the outer periphery of the rotary shaft to completely seal the gap between the end plate and the rotary shaft.

According to this document, it is possible to prevent leakage of lubricant due to evaporation of lubricating oil from the inside of the bearing, and to prevent adhesion of evaporating oil to the magnetic disk. Accordingly, the magnetic head becomes operable in a good condition at all times.

However, in the art described in JP 11-166526 A, since there is a gap between the shield plate and the inner peripheral surface of the sleeve, it is difficult to prevent diffusion of evaporating oil from the gap, and to effectively prevent diffusion of evaporating oil from the inside of the bearing.

In the art described in JP 58-220275 A, the magnetic fluid adheres to both the inner peripheral edge of the end plate and the outer peripheral surface of the rotary shaft in order to seal the gap between the end plate and the rotary shaft. Thus, it is possible to prevent diffusion of evaporating lubricating oil (evaporating oil) from the inside of the bearing. However, it is difficult to effectively prevent generation and diffusion of evaporating oil originating from the magnetic fluid provided outside the bearing. Eventually, this makes difficult to prevent adhesion of evaporating oil to the magnetic disk.

In the art described in JP 58-220275 A, a bearing is disposed in an air-tight chamber for which a magnetic fluid is used to prevent diffusion of evaporating oil from the inside of the bearing. However, evaporating oil may be generated and diffused from the magnetic fluid. In addition, the colloidal magnetic fluid may increase torque of the bearing device thereby reducing the response performance of the magnetic head. Therefore, the device is not so useful in preventing adhesion of evaporating oil to a magnetic disk. Thus, it has been desired to develop a rolling bearing device for swing arm capable of preventing generation and diffusion of evaporating oil without using a magnetic fluid outside a bearing, that is, without disposing a bearing in an air-tight chamber.

SUMMARY OF THE INVENTION

The present invention has been made in view of the foregoing circumstances, and it is an objective of the present invention to provide a pivot assembly bearing device capable of effectively preventing diffusion of evaporating oil from the inside of a rolling bearing such as a ball bearing without disposing the bearing in an air-tight chamber.

It is also an objective of the present invention to provide a magnetic head actuator including the pivot assembly bearing device and capable of preventing diffusion of evaporating oil from the inside of a rolling bearing to effectively prevent adhesion of the evaporating oil to a magnetic disk or a magnetic head.

In order to address the foregoing issue, there are provided the following.

A first aspect of the present invention provides a pivot assembly bearing device comprising: a shaft; a sleeve; a rolling bearing disposed between the shaft and the sleeve for supporting the sleeve rotatable in relation to the shaft, the rolling bearing containing a lubricant sealed therein; an annular portion that extends radially from the shaft or the sleeve at at least one end portion of the shaft or the sleeve in an axial direction to form a seal gap between the annular portion and an inner peripheral surface of the sleeve or an outer peripheral surface of the shaft; and a permanent magnet disposed such that an interval between magnetic flux lines in a diffusion path of an oil content of the lubricant coming from an inside of the bearing becomes larger toward the inner side of the bearing, or such that the magnetic flux lines intersect the diffusion path.

A second aspect of the present invention provides a pivot assembly bearing device comprising: a shaft; a sleeve; a rolling bearing disposed between the shaft and the sleeve for supporting the sleeve rotatable in relation to the shaft, the rolling bearing containing a lubricant sealed therein; an annular portion that extends radially from the shaft or the sleeve at at least one end portion of the shaft or the sleeve in an axial direction to form a seal gap between the annular portion and an inner peripheral surface of the sleeve or an outer peripheral surface of the shaft; and a permanent magnet disposed such that a magnetic pole is provided in proximity to the seal gap.

A third aspect of the present invention provides the pivot assembly bearing device according to the first or second aspect, in which the permanent magnet is magnetized in the axial direction.

A fourth aspect of the present invention provides the pivot assembly bearing device according to any one of the first to third aspects, in which the permanent magnet is disposed on a side of an outer periphery of the sleeve.

A fifth aspect of the present invention provides the pivot assembly bearing device according to any one of the first to fourth aspects, in which the permanent magnet is annular or cylindrical.

A sixth aspect of the present invention provides the pivot assembly bearing device according to the fifth aspect, in which the permanent magnet is cylindrical, and fitted to an outer periphery of the sleeve.

A seventh aspect of the present invention provides the pivot assembly bearing device according to the fifth aspect, in which the permanent magnet is annular, and a plurality of such permanent magnets are stacked on each other and fitted to an outer periphery of the sleeve.

An eighth aspect of the present invention provides the pivot assembly bearing device according to any one of the first to third aspects, in which the permanent magnet is disposed on a side of an end portion of the sleeve.

A ninth aspect of the present invention provides the pivot assembly bearing device according to the eighth aspect, in which the permanent magnet disposed on the side of the end portion of the sleeve includes two annular permanent magnets, an outside diameter of one of the two permanent magnets being smaller than an inside diameter of the other, and the two permanent magnets being concentrically coupled to each other by an annular yoke made of a magnetic substance.

A tenth aspect of the present invention provides the pivot assembly bearing device according to any one of the first to fifth, eighth, and ninth aspects, in which the permanent magnet is fitted to at least the sleeve or the shaft.

An eleventh aspect of the present invention provides a magnetic head actuator comprising a pivot assembly bearing device that rotatably supports a swing arm provided with a magnetic head at a distal end portion, the pivot assembly bearing device being the pivot assembly bearing device according to any one of the first to tenth aspects.

According to each of the above aspects regarding the pivot assembly bearing device, it is possible to provide the pivot assembly bearing device capable of effectively preventing diffusion of evaporating oil from the inside of a rolling bearing such as a ball bearing without adopting a configuration of disposing a bearing in an air-tight chamber.

According to the above aspect regarding the magnetic head actuator, it is possible to provide the magnetic head actuator capable of preventing diffusion of evaporating oil from the inside of a rolling bearing so as to effectively prevent adhesion of the evaporating oil to a magnetic disk or a magnetic head.

BRIEF DESCRIPTION OF THE DRAWINGS

FIG. 12 is a table which indicates the values of $\Box B2/\Box y$ obtained through simulations in both Examples and Comparative Examples;

DETAILED DESCRIPTION OF THE EMBODIMENTS

Figure 1:
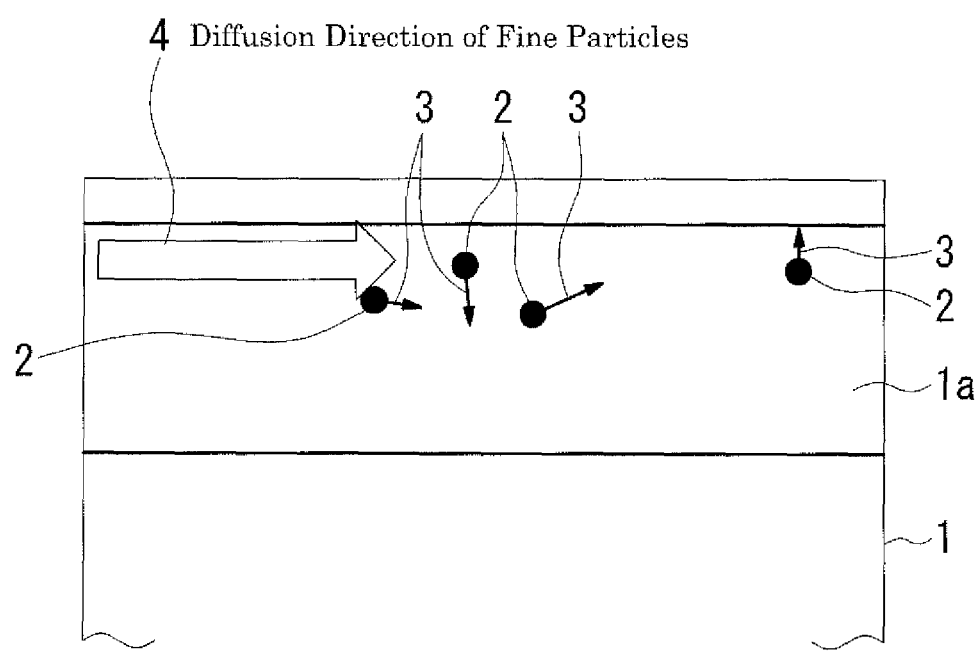
FIG. 1 is a drawing which illustrates the principle of the present invention.

Before starting to explain each embodiment of the present invention with reference to the drawings, how this invention was developed and the principle of the invention will be described hereinafter.

When the temperature of a bearing becomes higher during operation of a pivot assembly bearing device, an oil content of lubricant such as grease evaporates, and evaporating oil leaks from the interior of a rolling bearing such as a ball bearing to the outside of the rolling bearing. The evaporating oil is then diffused. Thus, in a case where the pivot assembly bearing device is applied to a magnetic head actuator, the evaporating oil may adhere to a magnetic disk or a magnetic head thereby causing problems to read/write operation of data.

Conventionally, diffusion of oil contained in lubricant has been prevented to some degree by providing a shield plate or a magnetic fluid seal as described above, or by adopting grease, containing ester oil with low evaporativity as base oil, to lubricant. However, there still exists a high demand to prevent diffusion of the evaporated oil content.

Further, in a configuration in which diffusion of evaporating oil from the inside of the bearing is prevented by disposing a bearing in an air-tight chamber, evaporating oil is generated and diffused from the magnetic fluid outside the bearing even if diffusion of evaporating oil from the inside of the bearing is prevented. Thus, the configuration is not so useful in preventing adhesion of evaporating oil to a magnetic disk.

Thus, it has been a task to develop a pivot assembly bearing device capable of effectively preventing diffusion of evaporating oil from the inside of a rolling bearing without disposing a bearing in an air-tight chamber.

As a result of diligent experiments and studies, the inventors have finally found that diffusion of evaporating oil generated from lubricant such as grease inside a rolling bearing of a pivot assembly bearing device can be effectively prevented using a magnetic field.

That is, the inventors have focused on the fact that a base oil component evaporated from the lubricant has diamagnetism, and have finally devised a magnetic seal that seals an oil component evaporated from the lubricant inside a rolling bearing of a pivot assembly bearing device using the repulsion of a magnet to effectively prevent diffusion of the oil component to the outside. Examples of the base oil component evaporated from lubricant such as grease include polyalphaolefin (PAO) and an ester oil component.

The principle of the magnetic seal will be described below.

The term "diamagnetism" refers to the action in which a substance is magnetized in a magnetic field space in the opposite direction to the magnetic field, and a force that is proportional to the product of the magnetic field and the gradient of the magnetic field is applied in the repulsive direction to a magnet. Water, copper, wood, and most organic substances such as petroleum and plastic exhibit diamagnetism. Lubricating oil, base oil used for grease in lubricant, and so forth are also materials that exhibit diamagnetism.

Repulsive force Fx in an x direction, for example, that acts on a diamagnetic material m in the magnetic field of a magnetic flux density B is represented by the following formula (1):

[Formula 1]

$$F_x = \frac{1}{\mu_0} \chi_m B \frac{\partial B}{\partial x} \quad (1)$$

where:
$\mu_0$: permeability in vacuum (constant $4\pi \times 10^{-7}$ H/m)
$\chi_m$: bulk magnetic susceptibility (physical property value of material m)
B: magnetic flux density
$\partial B/\partial x$: gradient of magnetic flux density in an x direction (gradient of magnetic field)

Here, since the term of partial differential is expandable into $\partial B^2/\partial x = 2B(\partial B/\partial x)$, the formula (1) may also be represented by the following formula (2):

[Formula 2]

$$F_x = \frac{1}{2\mu_0} \chi_m \frac{\partial B^2}{\partial x} \quad (2)$$

In the formula (2), it is seen that the repulsive force Fx is directly proportional to $\partial B^2/\partial x$ because $\mu_0$ and $\chi_m$ are constants. The same applies to repulsive forces that act in a y direction and in a z direction. In other words, Fx, Fy, and Fz are represented by the following formula (3):

$$Fx \propto \partial B^2/\partial x$$

$$Fy \propto \partial B^2/\partial y$$

$$Fz \propto \partial B^2/\partial z \quad (3)$$

Thus, in order to constitute a magnetic seal based on diamagnetism, a magnet (permanent magnet) is preferably disposed such that the value of the gradient of the square of the magnetic flux density ($\partial B^2/\partial x$ in the formula (2)) in a diffusion path of organic molecules evaporated from lubricant such as grease becomes as large as possible, in other words, the gradient of the magnetic field becomes as large as possible. The gradient of the magnetic field is larger in a region in which the magnetic flux density is higher. Thus, preferably, a magnetic field region in which there are a larger number of magnetic flux lines, that is, a magnetic field region in which the spacing between magnetic flux lines is as small as possible overlaps the diffusion path.

Figure 2:
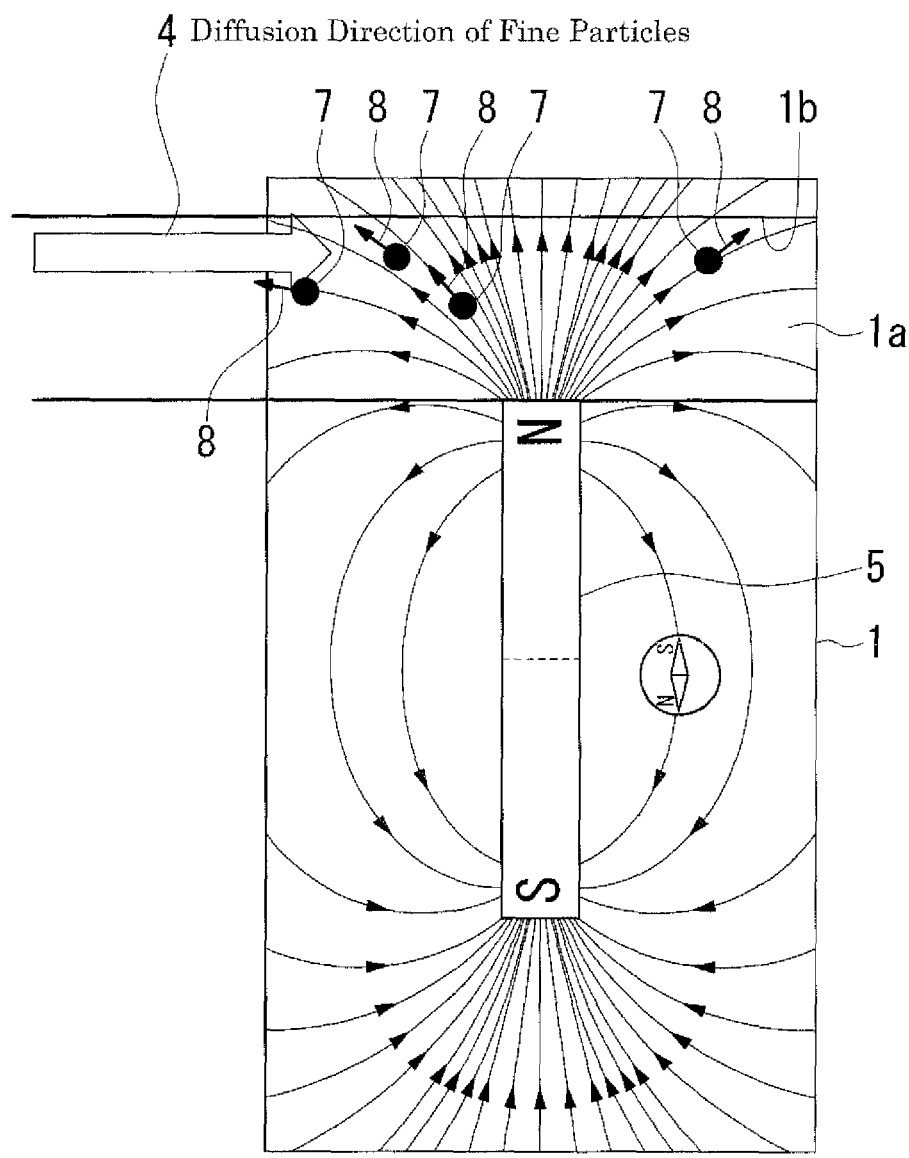
FIG. 2 is a drawing which also illustrates the principle of the present invention.

The above consideration will be described below with reference to schematic diagrams (FIGS. 1 and 2).

As illustrated in FIG. 1, in a case where ferromagnetic fine particles 2 are placed in a space 1 with no magnetic field acting on the space 1, the fine particles 2 randomly move and are diffused through a diffusion path 1a (see arrows 3 in FIG. 1).

That is, in a case where there is no magnet in the space 1, the fine particles 2 such as ferromagnetic fine iron particles randomly move to be diffused (diffused toward the right side where the density is low as indicated by arrow 4).

As illustrated in FIG. 2, in a case where diamagnetic evaporating oil 7 is placed in the space 1 in a condition that a magnetic field acts in the space 1 because of a magnet 5, force acts in a direction of repulsion from the magnet 5 on the evaporating oil 7. Thus, the evaporating oil 7 is repelled either toward the left or the right with respect to a magnetic flux line extending straight from the magnet 5 in the diffusion path 1a in FIG. 2 (see arrows 8 in FIG. 2). At this time, if the left side corresponds to the inner side of a rolling bearing of a pivot assembly bearing device, it means that the evaporating oil 7 repelled toward the left side is prevented from being diffused. Even if the evaporating oil 7 reaches the right side, the evaporating oil 7 is repelled so as to adhere to a wall surface 1b of the diffusion path 1a, and thus is prevented from being diffused. In order to prevent diffusion of the evaporating oil 7 from lubricant such as grease inside the rolling bearing utilizing a repulsive force due to diamagnetism, the positional relationship between the gap serving as the diffusion path 1a for the evaporating oil 7 and the magnetic flux lines of the magnet 5 becomes important. Specifically, in order to prevent diffusion of the evaporating oil 7 utilizing a repulsive force due to diamagnetism, the magnet 5 is preferably disposed such that the spacing between magnetic flux lines is increased toward the inner side of the rolling bearing on the diffusion path 1a, or such that the magnetic flux lines intersect the diffusion path 1a.

That is, in a case where the magnet 5 is provided in the space 1, the diamagnetic evaporating oil 7 receives a force opposite to the direction of a magnetic pole along the magnetic flux lines so as to move away from the magnetic pole.

As indicated by the formula (2), the repulsive force Fx due to diamagnetism tends to become larger as $\partial B^2/\partial x$ which represents the gradient of the magnetic flux density increases, that is, as the number of magnetic flux lines per unit area increases. Thus, in order to prevent diffusion of the evaporating oil 7 utilizing a repulsive force due to diamagnetism, magnetic flux lines are preferably dense in a gap that serves as the diffusion path 1a for the evaporating oil 7. The present invention is based on such a consideration.

A pivot assembly bearing device according to examples of the present invention will be described below together with comparative examples.

In the examples, all components of a rolling bearing (for example, a ball bearing) of the pivot assembly bearing device are made of a magnetic material, and components of the pivot assembly bearing device other than the components of the ball bearing, such as a shaft, a sleeve, and seal plates, for example, are made of a non-magnetic material.

Figure 3:
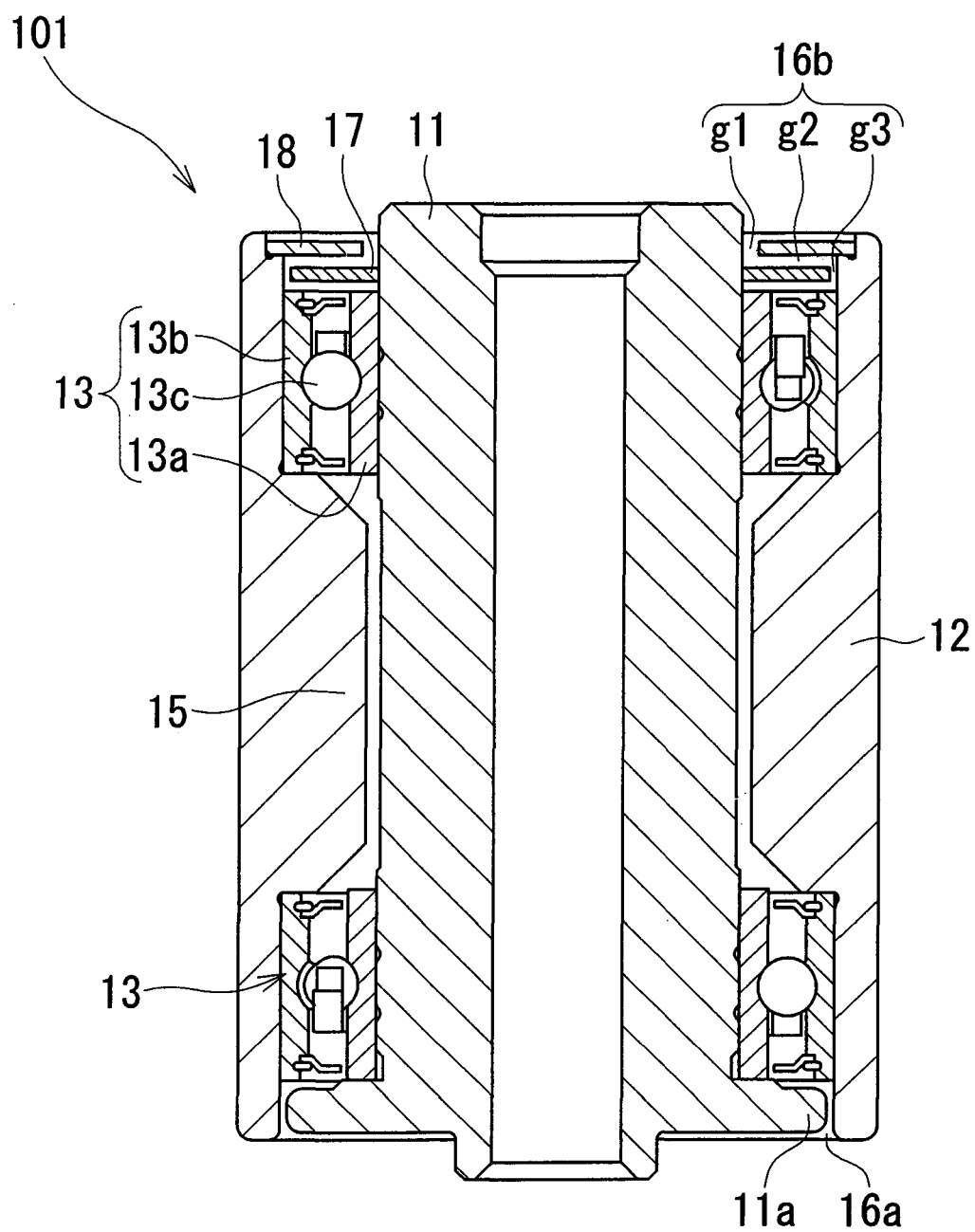
FIG. 3 is a sectional drawing which illustrates a pivot assembly bearing device (basic configuration) to which the present invention is applied.

As illustrated in FIG. 3, the pivot assembly bearing device to which the present invention is applied (the basic configuration of the pivot assembly bearing device) comprises a shaft 11, a sleeve 12, a pair of ball bearings 13, 13, a spacer portion 15, and labyrinth seals 16 (16a, 16b).

In the above case, the sleeve 12 is formed in a substantially cylindrical shape, and disposed coaxially on the outer peripheral side of the shaft 11.

The pair of ball bearings 13 each includes an inner race 13a, an outer race 13b, balls 13c held between the inner race 13a and the outer race 13b, and so forth. Lubricant such as grease or lubricating oil is sealed inside the ball bearings 13. The ball bearings 13 are disposed spaced apart from each other at the upper end portion and lower end portion of the shaft 11 as shown in FIG. 3. Each of the inner races 13a is fitted to the outer periphery of the shaft 11 and each of the outer races 13b is fitted to the inner periphery of the sleeve 12. By this way the ball bearings 13 support the sleeve 12 rotatably in relation to the shaft 11.

The spacer portion 15 is formed on the inner peripheral side of the sleeve 12 between the ball bearings 13, 13.

The labyrinth seals 16 (16a, 16b) are seal gaps provided to prevent leakage of lubricant sealed in the ball bearings 13, 13, and are provided at the end portions of the shaft 11.

A flange portion 11a is formed at one of the end portions of the shaft 11, in this case, at the lower end portion thereof. The external dimensions of the flange portion 11a are set such that the outer peripheral surface of the flange portion 11a faces the inner peripheral surface of the sleeve 12 via a gap. The gap forms a first labyrinth seal (seal gap) 16a.

An annular first seal plate 17 is fitted to the other end portion of the shaft 11, in this case, at the upper end portion thereof. In addition, an annular second seal plate 18 is provided on the axially outer side with respect to the first seal plate 17, and fitted to the inner peripheral surface of the sleeve 12. The first seal plate 17 and the second seal plate 18 are set so as to form gaps g1 to g3 between the second seal plate 18 and the shaft 11, between the first seal plate 17 and the second seal plate 18, and between the outer peripheral surface of the first seal plate 17 and the inner peripheral surface of the sleeve 12, respectively. The gaps form a second labyrinth seal (seal gap) 16b.

Metal bearing components such as the inner race 13a, the outer race 13b, and the balls 13c constituting the ball bearings 13 are made by steel which is magnetic. Metal components of the pivot assembly bearing device other than the components of the ball bearings 13, such as the shaft 11, the sleeve 12, the spacer portion 15, and the seal plates 17 and 18, are made by a non-magnetic material.

The inventors performed simulations to verify the magnetic seal effect disposing a permanent magnet at different positions of the pivot assembly bearing device having the above basic configuration (FIG. 3) as described later. In the simulations, the calculation was performed with the axial direction defined as y direction, the origin placed on the lower end side of the shaft 11, and the direction toward the upper end of the shaft 11 defined as the positive direction.

According to the basic configuration described above, a repulsive force in y direction (axial direction) contributes significantly to the effect in preventing diffusion of the evaporating oil 7 (see FIGS. 1 and 2). Thus, in the simulations, larger values of $\partial B^2/\partial_y$ were evaluated as having a higher magnetic seal effect in preventing diffusion of the evaporating oil 7.

Example 1

Figure 4:
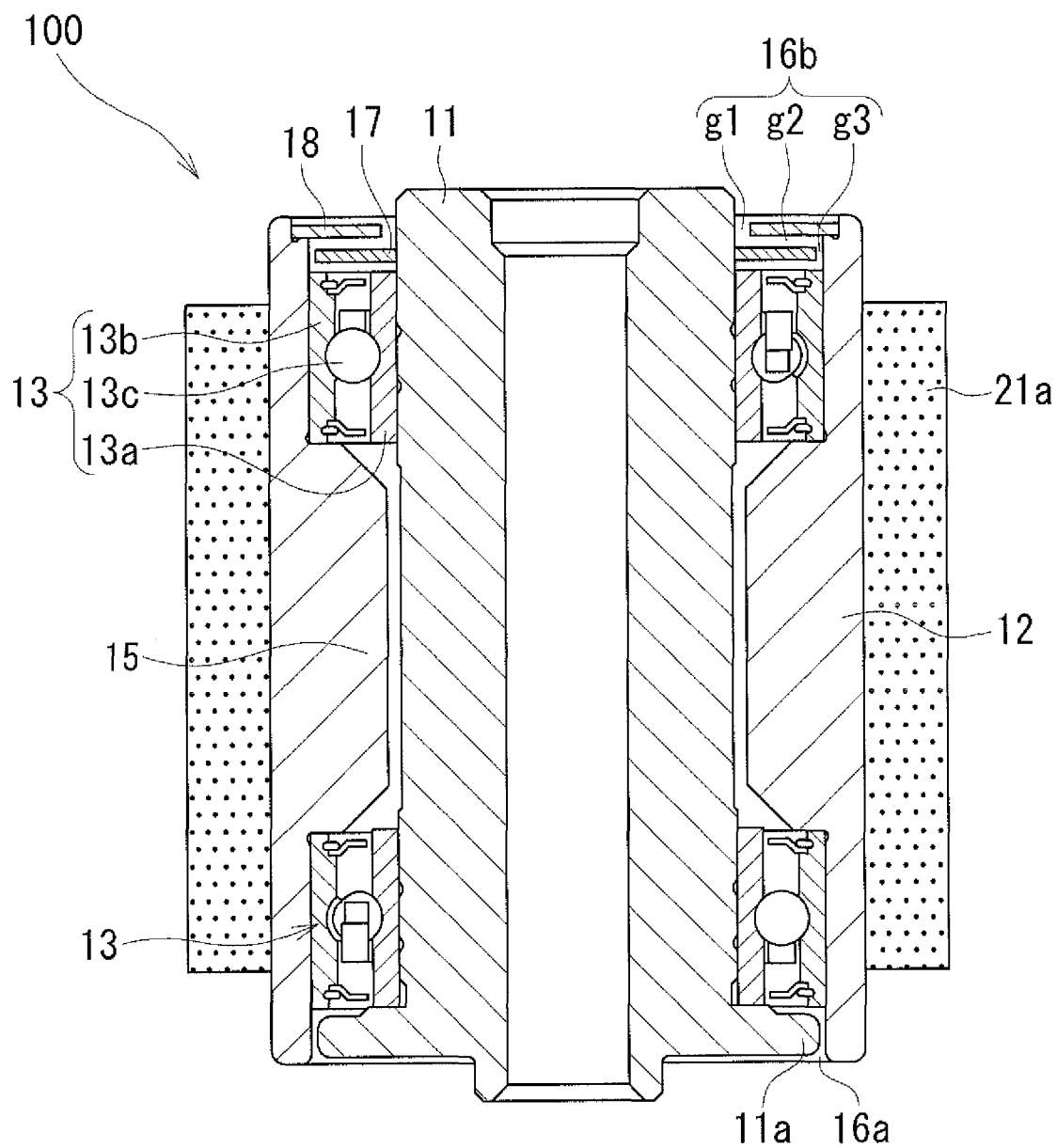
FIG. 4 is a sectional drawing which illustrates a pivot assembly bearing device according to Example 1 of the present invention.

As illustrated in FIG. 4, a cylindrical pet anent magnet 21a was fitted coaxially to the outer periphery of the sleeve 12 of the basic configuration illustrated in FIG. 3 to obtain Example 1. The cylindrical permanent magnet 21a is magnetized in the axial direction (vertical direction of the drawing) with an end surface on one side in the axial direction serving as N pole and the other end surface serving as S pole. The cylindrical permanent magnet 21a is disposed such that the magnetic poles are located in proximity to the labyrinth seals 16a, 16b. The magnetic poles of the cylindrical permanent magnet 21a (the end surfaces of the cylindrical permanent magnet 21a) are preferably provided in proximity to the labyrinth seals (seal gaps) 16a, 16b so as to overlap the axial position between the center of the ball bearing 13 in the axial direction and the end surface of the sleeve 12.

The cylindrical permanent magnet 21a may be a unitary cylindrical structure, or may be a cylindrical structure formed by stacking a plurality of annular permanent magnets on each other in the axial direction.

Figure 5:
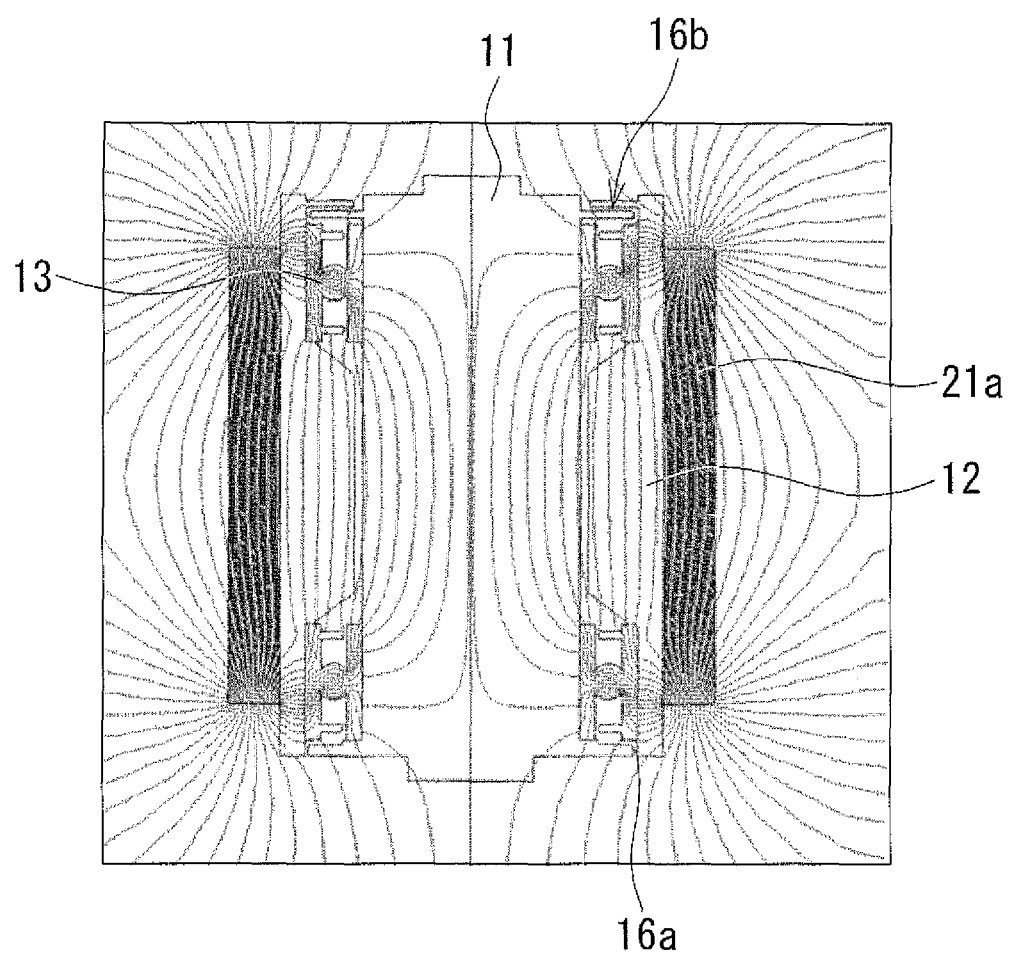
FIG. 5 is a magnetic flux line diagram which illustrates the simulation results for Example 1.

Simulation Results for Example 1 (see FIG. 5):

According to the magnetic flux line diagram illustrated in FIG. 5, it is seen from the distribution of magnetic flux lines that the end surfaces (magnetic poles) of the cylindrical permanent magnet 21a are located in proximity to the labyrinth seals 16a, 16b serving as the diffusion path 1a (see FIG. 2) of the evaporating oil 7. Thus, a magnetic seal effect based on diamagnetism is obtained with the configuration according to Example 1.

Example 2

Figure 6:
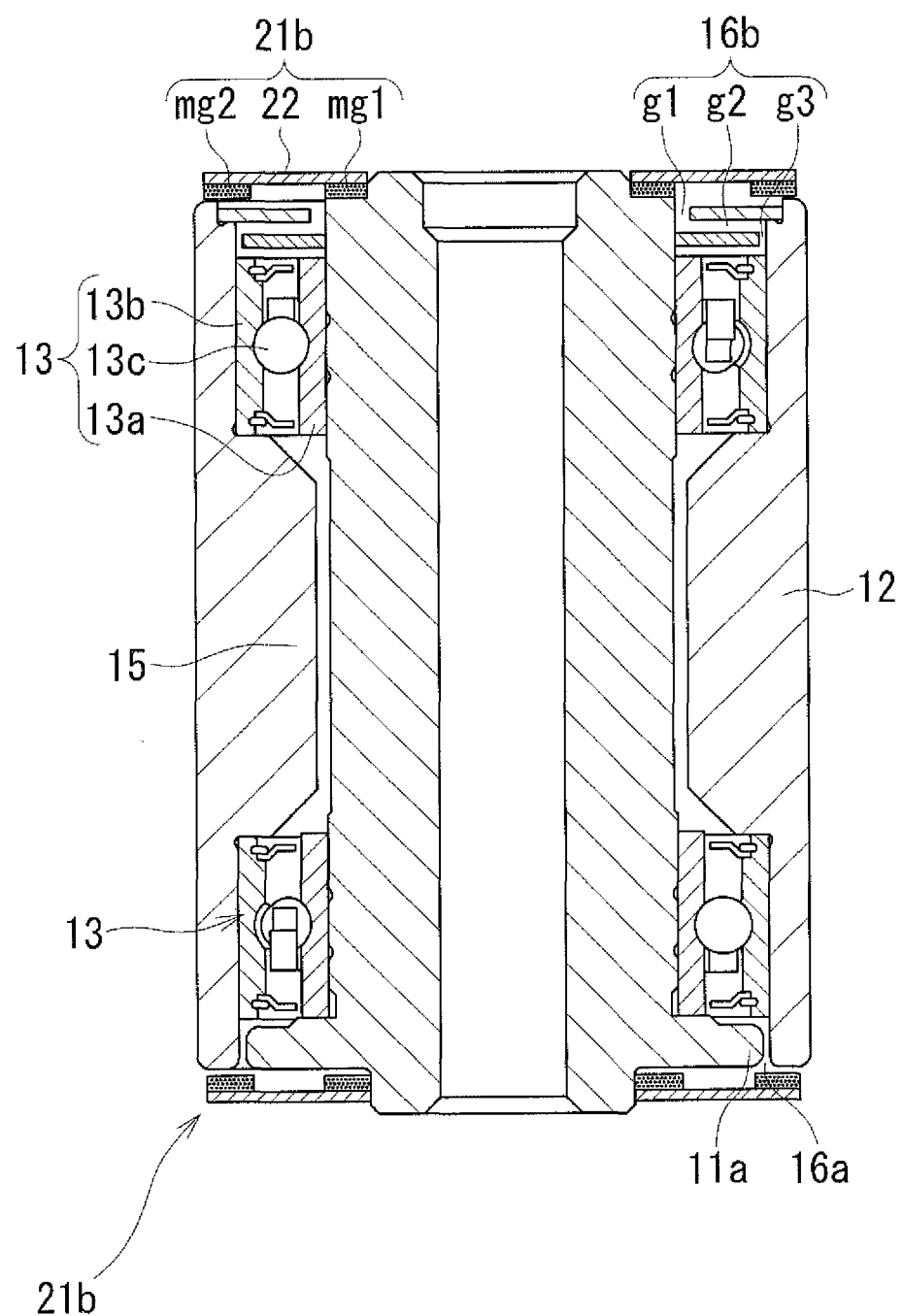
FIG. 6 is a sectional drawing which illustrates a pivot assembly bearing device according to Example 2 of the present invention.

As illustrated in FIG. 6, annular permanent magnets 21b were fitted to the end surfaces of the sleeve 12 of the basic configuration illustrated in FIG. 3 to obtain Example 2. The annular permanent magnets 21b are magnetized in the axial direction, and disposed with the magnetic poles located in proximity to the labyrinth seals 16a, 16b.

In Example 2, the annular permanent magnets 21b, which each includes two annular permanent magnets mg1, mg2 with different diameters, are fabricated and disposed such that the magnetic poles on the radially inner side and the radially outer side have opposite polarities, and the annular permanent magnets mg1, mg2 are concentrically coupled to each other by an annular yoke 22 made of a ferromagnetic substance. This intensifies a magnetic field to enhance the magnetic seal effect based on diamagnetism.

Figure 7:
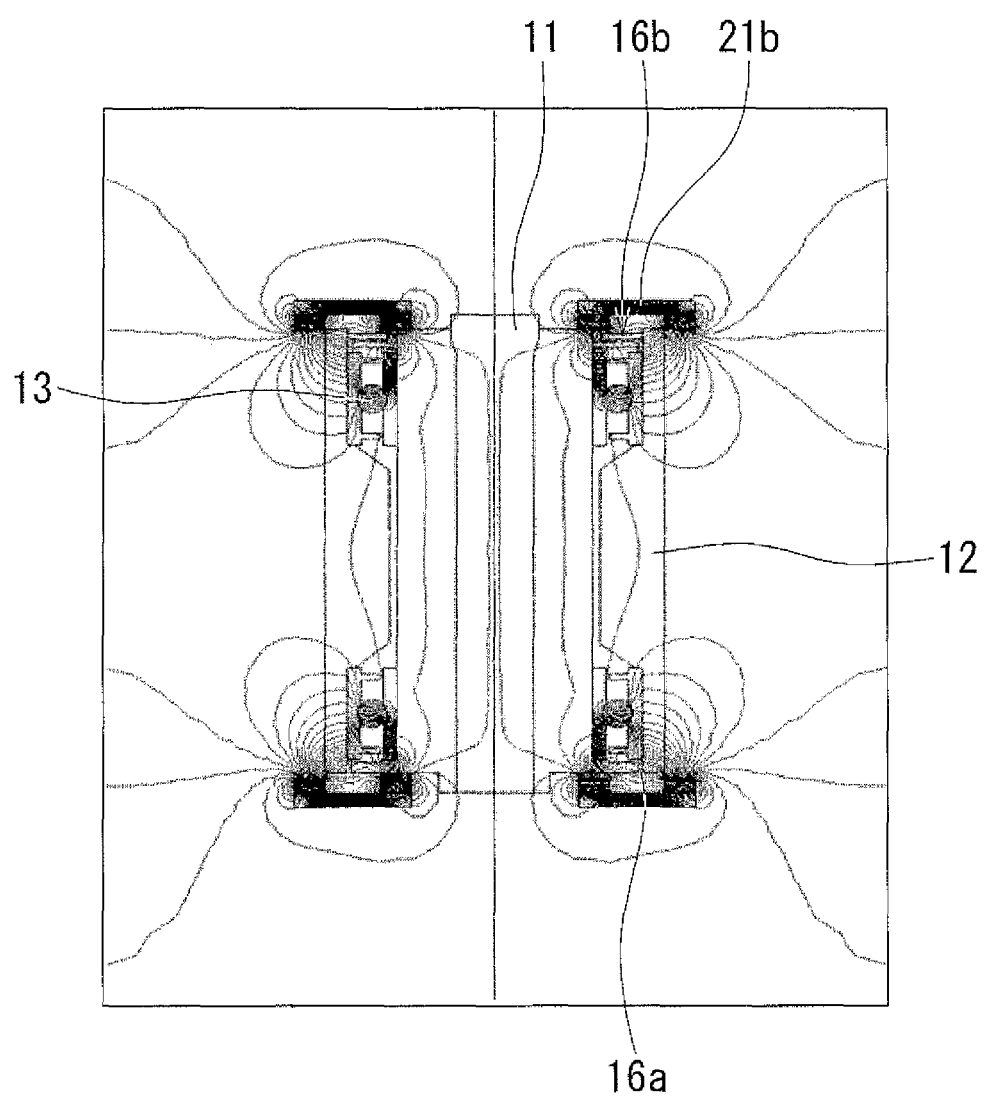
FIG. 7 is a magnetic flux line diagram which illustrates the simulation results for Example 2.

Simulation Results for Example 2 (see FIG. 7):

According to the magnetic flux line diagram illustrated in FIG. 7, it is seen that magnetic flux lines extending toward the inside of the ball bearings 13, 13 overlap the labyrinth seals 16a, 16b serving as the diffusion path 1a (see FIG. 2)

of the evaporating oil 7, and that the magnetic seal effect based on diamagnetism is obtained.

Comparative Example 1

Figure 8:
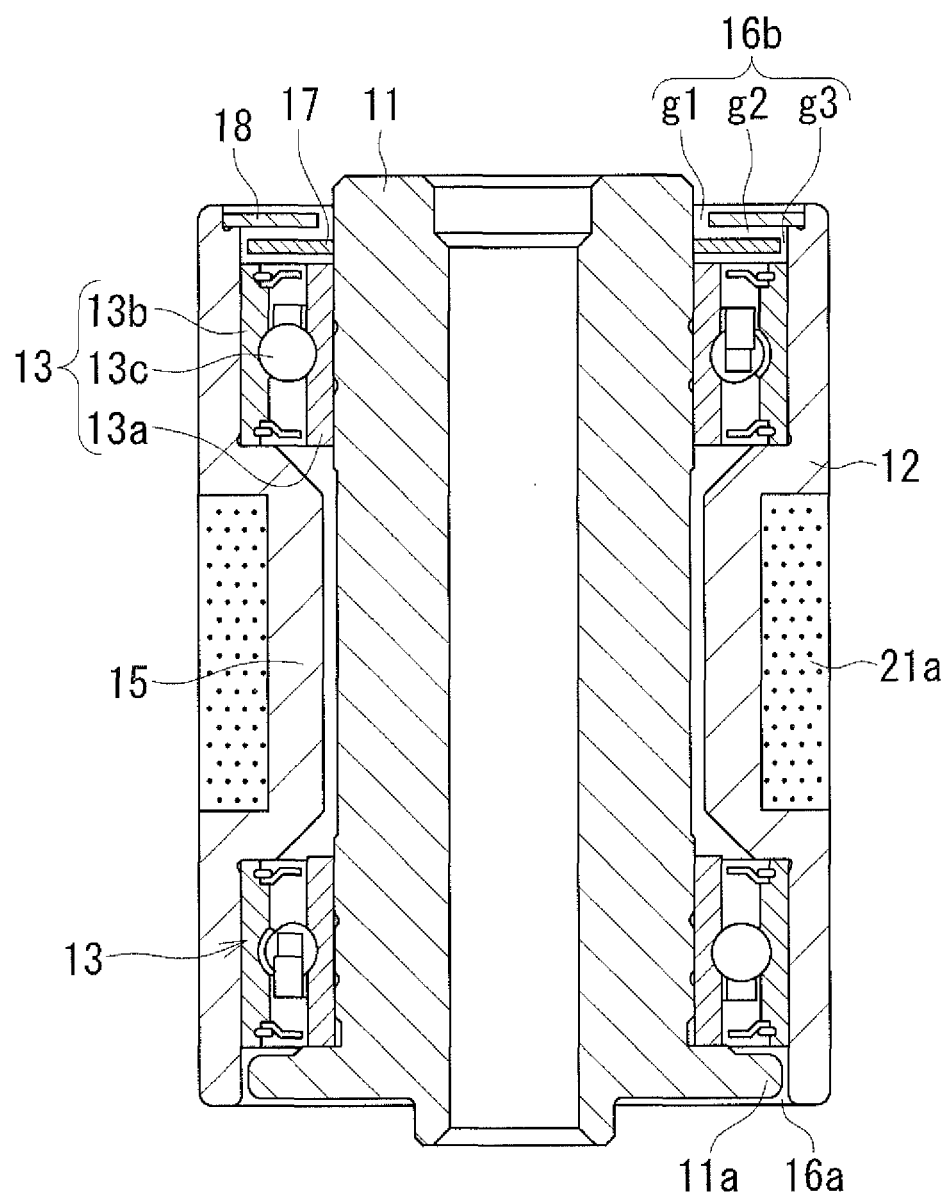
FIG. 8 is a sectional drawing which illustrates a pivot assembly bearing device according to Comparative Example 1.

In Comparative Example 1, as illustrated in FIG. 8, a cylindrical permanent magnet 21a is disposed coaxially with the outer periphery of the sleeve 12 of the basic configuration illustrated in FIG. 3, but the magnetic poles of the cylindrical permanent magnet 21a are not located in proximity to the labyrinth seals 16a, 16b.

Figure 9:
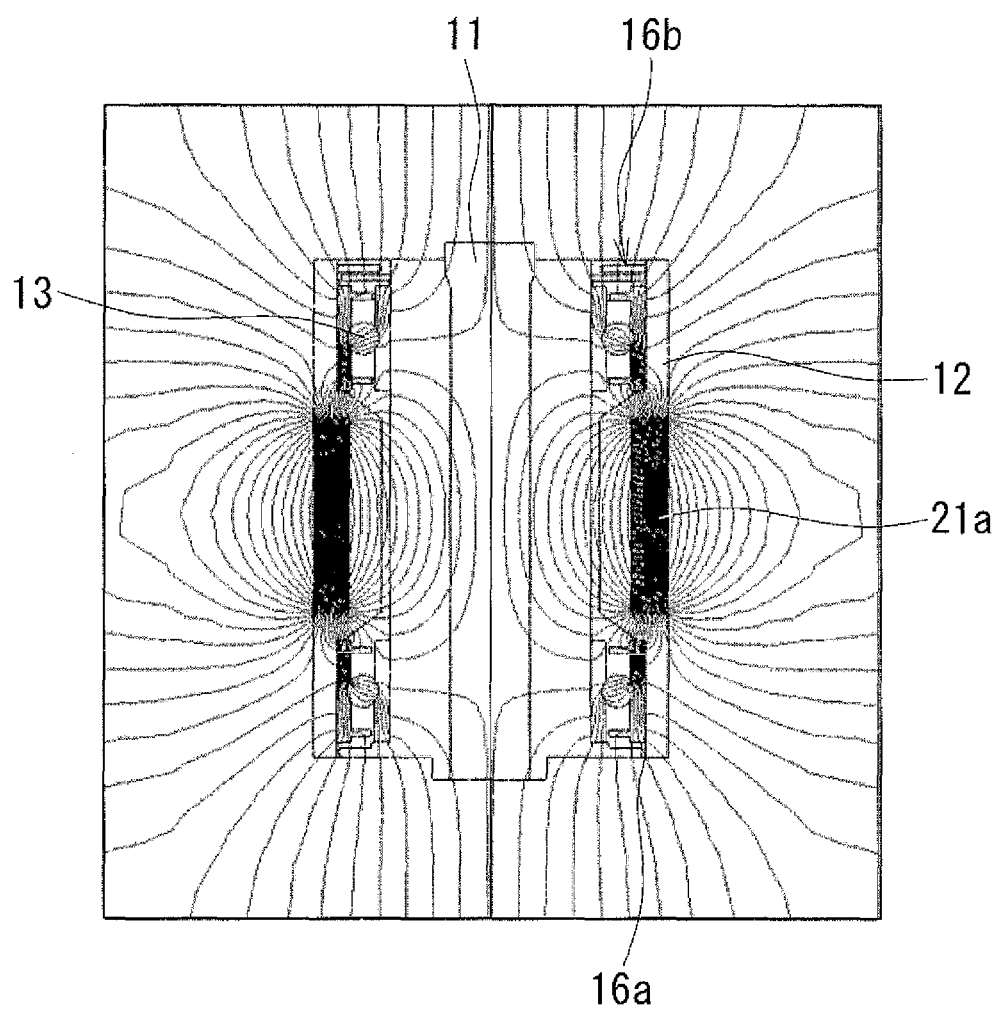
FIG. 9 is a magnetic flux line diagram which illustrates the simulation results for Comparative Example 1.

Simulation Results for Comparative Example 1 (see FIG. 9):

According to the magnetic flux line diagram illustrated in FIG. 9, it is seen that a region of the magnetic field with sparse magnetic flux lines overlaps the labyrinth seals 16a, 16b serving as the diffusion path 1a (see FIG. 2) of the evaporating oil 7. Thus, the repulsive force due to diamagnetism that acts on the evaporating oil 7 is small, and an effective magnetic seal effect is not obtained.

Comparative Example 2

Figure 10:
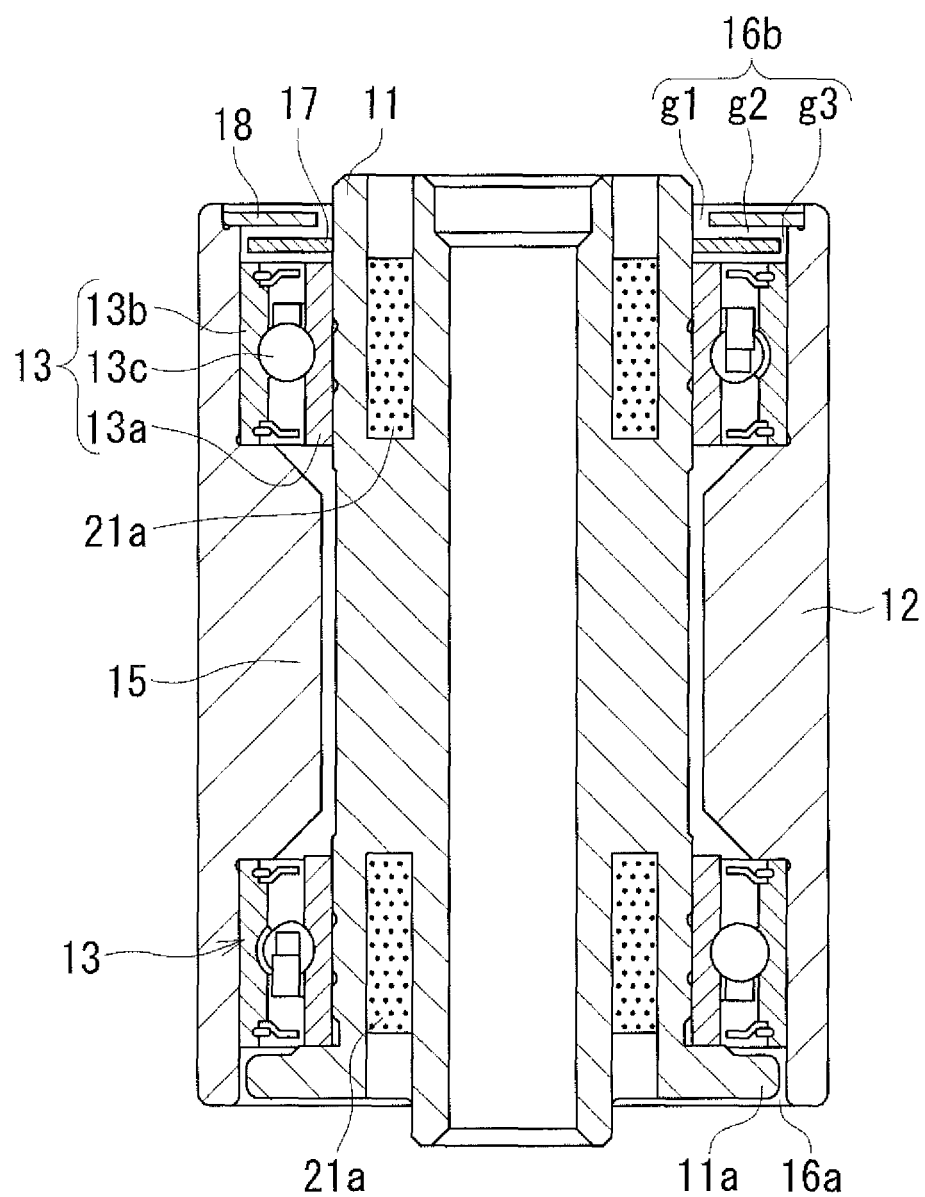
FIG. 10 is a sectional drawing which illustrates a pivot assembly bearing device according to Comparative Example 2.

In Comparative Example 2, as illustrated in FIG. 10, cylindrical permanent magnets 21a are disposed in recessed portions 19 formed in both end portions (upper and lower end portions in the drawing) of the shaft 11 of the basic configuration illustrated in FIG. 3, but the magnetic poles of the cylindrical permanent magnets 21a are located away from the labyrinth seals 16a, 16b.

Figure 11:
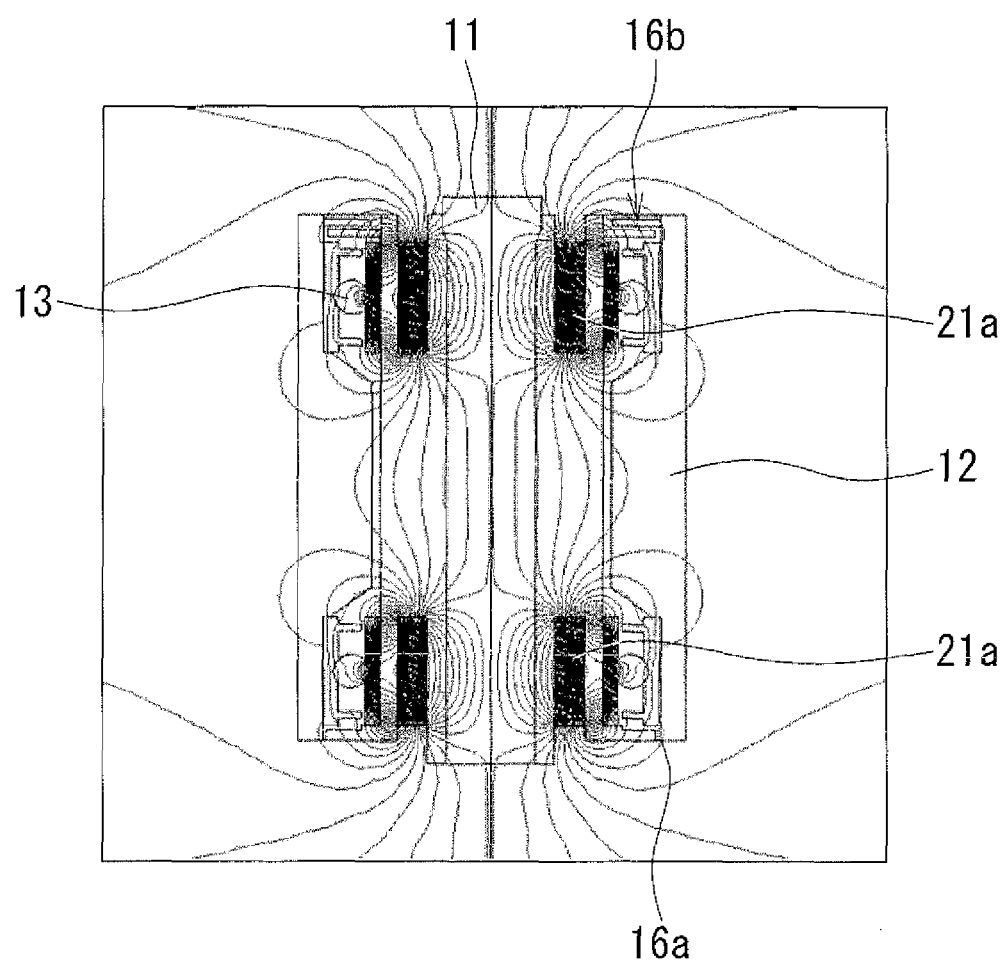
FIG. 11 is a magnetic flux line diagram which illustrates the simulation results for Comparative Example 2.

Simulation Results for Comparative Example 2 (see FIG. 11):

Referring to the magnetic flux line diagram illustrated in FIG. 11, it is seen that the labyrinth seals 16a, 16b serving as the diffusion path 1a (see FIG. 2) for the evaporating oil 7 are in a region of the magnetic field with sparse magnetic flux lines. Thus, the repulsive force due to diamagnetism that acts on the evaporating oil 7 is small, and an effective magnetic seal effect is not obtained.

<Verification of Magnetic Seal Effect>

FIG. 12 is a table indicating the values of $\partial B^2/\partial y$ for Example 1, Example 2, Comparative Example 1, and Comparative Example 2 obtained through the simulations.

As indicated by the formula (2), the repulsive force Fy is directly proportional to $\partial B^2/\partial y$. Thus, the magnetic seal effect in preventing diffusion of the evaporating oil 7 is higher as the value of $\partial B^2/\partial y$ is larger.

As seen from the table illustrated in FIG. 12, the values of $\partial B^2/\partial y$ for Example 1 and Example 2 are both larger than the $\partial B^2/\partial y$ values for Comparative Example 1 and Comparative Example 2.

For Example 1, as described later, a test was actually performed to verify the magnetic seal effect. Thus, it can be considered that the magnetic seal effect is achieved if the value of $\partial B^2/\partial y$ is equal to or more than 0.005. Accordingly, it can be considered that the magnetic seal effect is achieved also in Example 2 for which the value of $\partial B^2/\partial y$ is 0.010.

For both Comparative Example 1 and Comparative Example 2, however, the value of $\partial B^2/\partial y$ is less than 0.005 (exclusive), and it can be considered that the magnetic seal effect is insufficient.

A verification test for the magnetic seal effect of the pivot assembly bearing device according to Example 1 was performed as follows.

Figure 13:
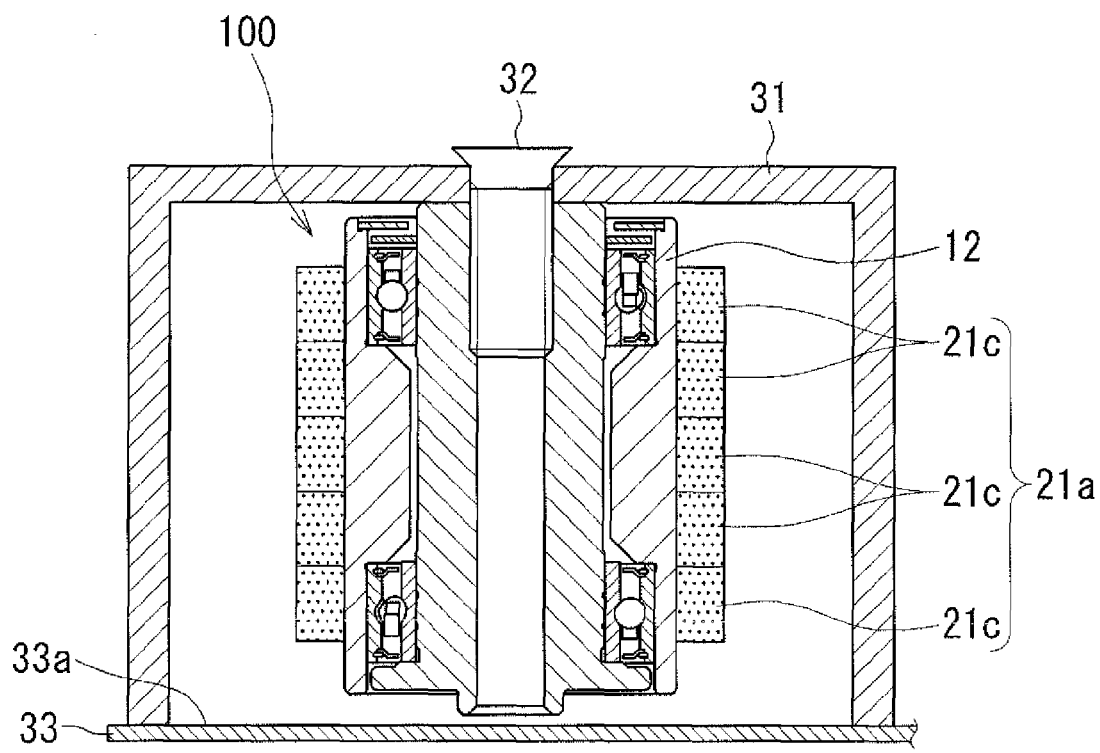
FIG. 13 is a drawing which illustrates a verification test for the magnetic seal effect of the pivot assembly bearing device according to Example 1.

As illustrated in FIG. 13, in a specific example of the pivot assembly bearing device 100 according to Example 1, the cylindrical permanent magnet 21a was replaced with five annular permanent magnets 21c provided on the outer periphery of the sleeve 12, and stacked on each other in the axial direction. The surface magnetic flux density of the annular permanent magnets 21c was 303 mT.

The pivot assembly bearing device 100 according to Example 1 was fixed by a screw 32 at the center of the back surface of the upper plate of a cup-shaped cover 31 made of aluminum. The cover 31 was installed such that the surface (magnetic disk surface 33a) of a magnetic disk 33, to which no lubricating layer was applied, and the pivot assembly bearing device 100 were arranged to face to each other. The distance between the lowermost portion of the pivot assembly bearing device 100 and the magnetic disk surface 33a was about 1.0 mm.

In the above condition, the verification test was performed by heating the assembly in an oven to 100° C., and leaving the assembly for 24 hours at a constant temperature of 100° C. For comparison, the same verification test was performed under the same conditions on a pivot assembly bearing device 101 without the cylindrical permanent magnet 21a (the pivot assembly bearing device of the basic configuration illustrated in FIG. 3).

The results (experiment results) of the verification test for the magnetic seal effect are as follows.

Figure 14A:
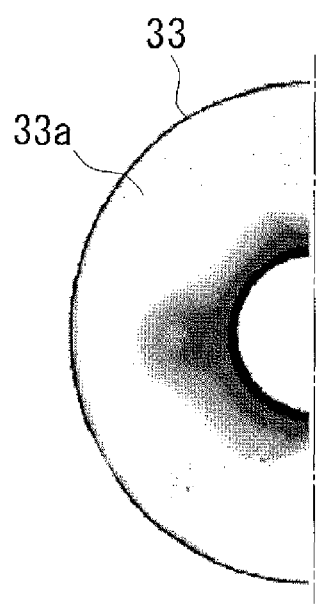
FIGS. 14A and 14B are drawings which illustrate the results of the verification test for the magnetic seal effect, by which the film thickness of adhered matter on a magnetic disk surface is mapped.
Figure 14B:
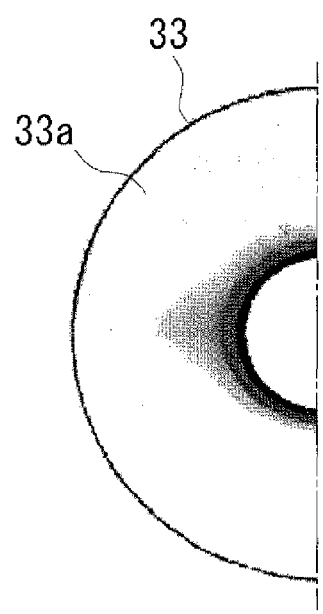

FIGS. 14A and 14B were prepared by a surface analyzing device (optical surface analyzer manufactured by Candela) by measuring the film thickness of adhered matter on the magnetic disk surface 33a over rotational angles of the magnetic disk 33 of 0° to 180°, and mapping the measurement results. In the optical surface analyzer, polarized light is obliquely directed to the magnetic disk surface 33a, and the reflectivity of reflected light is measured. Then, the distribution of the film thickness of a thin film on the magnetic disk surface 33a corresponding to the reflectivity is displayed in different colors or in gray scale. A darker display color, or a higher density, indicates a larger film thickness, that is, a larger amount of adhered matter due to the evaporating oil 7. In FIGS. 14A and 14B, display is made in gray scale, and thus a higher density, that is, a color closer to black, indicates a larger amount of adhered matter.

FIG. 14A is a mapping diagram corresponding to the pivot assembly bearing device 101 of the basic configuration illustrated in FIG. 3. FIG. 14B is a mapping diagram corresponding to the pivot assembly bearing device 100 according to Example 1.

When the mapping diagrams illustrated in FIGS. 14A and 14B are compared, it is seen that the amount of adhered matter in the pivot assembly bearing device 100 according to Example 1 illustrated in FIG. 14B is smaller.

Figure 15:
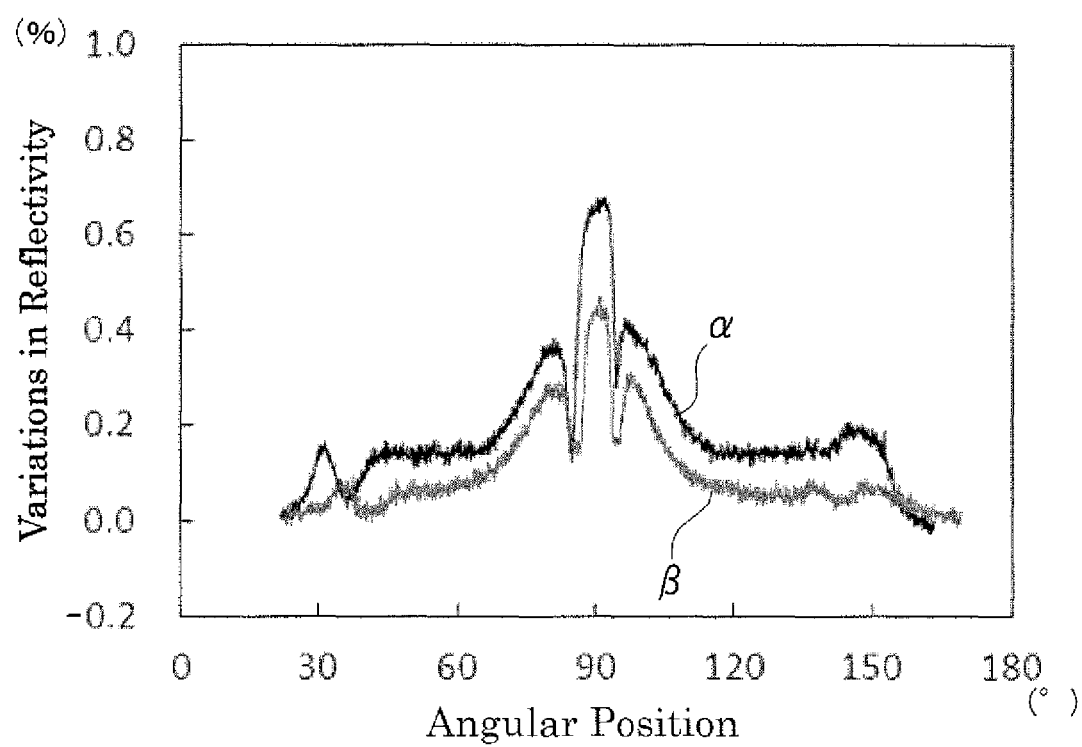
FIG. 15 is a graph which represents variations in reflectivity on the magnetic disk surface.

FIG. 15 illustrates the results of the verification test for the magnetic seal effect. More particularly, FIG. 15 is a graph that indicates variations in reflectivity of the magnetic disk surface 33a, represented in percentage (%), for semicircumference (rotational angle range from 0° to 180°) of a track at a predetermined position near the middle in the radial direction of the magnetic disk 33.

In FIG. 15, the curve α indicates variations in reflectivity for the pivot assembly bearing device 101 which is not provided with the cylindrical permanent magnet 21a, and the curve β indicates variations in reflectivity for the pivot assembly bearing device 100 (Example 1) which is provided with the cylindrical permanent magnet 21a.

In FIG. 15, the reflectivity is not varied in a case where there is no adhered matter on the magnetic disk surface 33a, and thus a variation value closer to 0% indicates a smaller amount of adhered matter due to the evaporating oil 7.

In general, variation of reflectivity in the curve β are smaller than those in the curve α. Thus, the pivot assembly bearing device 100 according to Example 1 produced a smaller amount of adhered matter.

In the pivot assembly bearing devices according to Examples 1 and 2 of the present invention, the ball bearings 13 in which lubricant is sealed are provided between the shaft 11 and the sleeve 12, the labyrinth seals (seal gaps) 16a, 16b are provided at the end portions in the axial direction of the sleeve 12, and the permanent magnet 21a or 21b is disposed such that the magnetic poles are located in proximity to the labyrinth seals 16a, 16b.

Consequently, the magnetic seal effect described above is provided in addition to the effect of the labyrinth seals 16a, 16b which prevents leakage of lubricant sealed inside the ball bearings 13. Thus, it is possible to effectively prevent diffusion of evaporating oil from the inside of the ball bearings 13 without disposing a bearing in an air-tight chamber.

In Example 2, in particular, the annular permanent magnet 21b is composed of the two annular permanent magnets mg1, mg2 with different diameters, and is fabricated and disposed such that the magnetic poles on the radially inner side and the radially outer side have opposite polarities, and the ferromagnetic annular yoke 22 coaxially couples the annular permanent magnets mg1, mg2 to each other. Thus, it is possible to intensify the magnetic field to enhance the magnetic seal effect due to diamagnetism in spite of the small size.

In Examples 1 and 2, ball bearings are used as the rolling bearings. However, other rolling bearings such as roller bearings may also be used.

Figure 16:
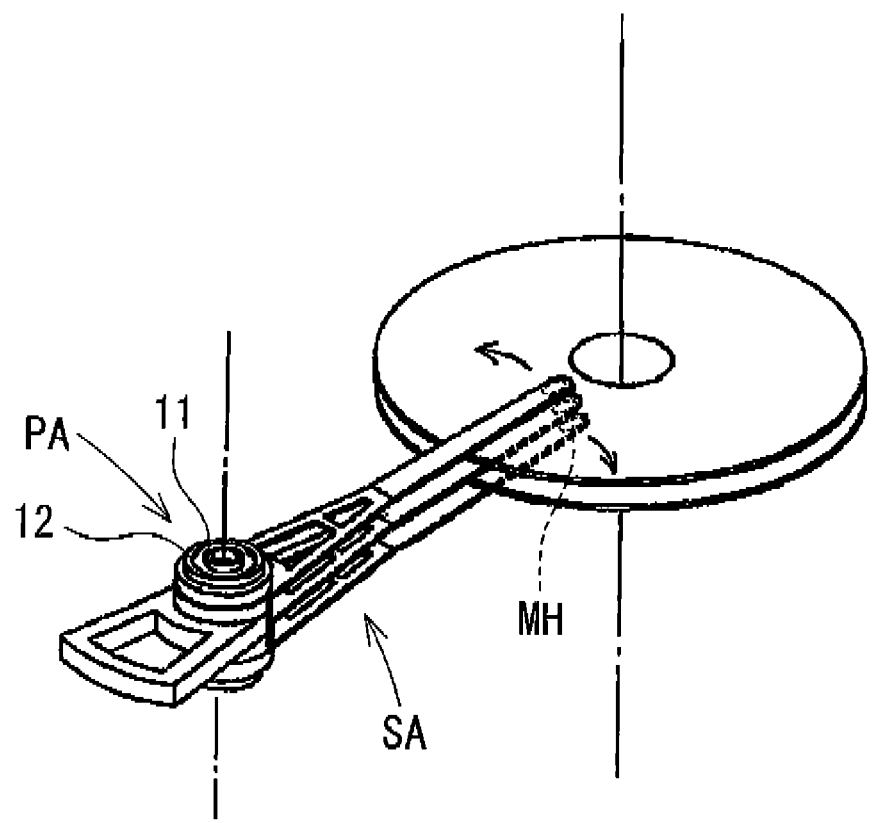
FIG. 16 is a perspective drawing which illustrates a magnetic head actuator for a hard disk drive.

As shown in FIG. 16, the pivot assembly bearing device according to the present invention may be applied to a pivot assembly bearing device (PA) of a magnetic head actuator for hard disk drive that supports a swing arm (SA) on which a magnetic head (MH) for reading and writing data is mounted.

Thus, the magnetic head actuator according to the present invention is possible to prevent diffusion of evaporating oil from the inside of the ball bearings (rolling bearings) to effectively prevent adhesion of the evaporating oil on the magnetic disk or the magnetic head.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A pivot assembly bearing device comprising:
   a shaft;
   a sleeve;
   a rolling bearing disposed between the shaft and the sleeve for rotatably supporting the sleeve in relation to the shaft, the rolling bearing containing a lubricant sealed therein;
   an annular portion that extends radially from the shaft or the sleeve at at least one end portion of the shaft or the sleeve in an axial direction to form a seal gap between the annular portion and an inner peripheral surface of the sleeve or an outer peripheral surface of the shaft; and
   at least one pair of permanent magnets disposed such that a magnetic pole is provided in proximity to the seal gap, wherein:
   each magnet of the at least one pair of permanent magnets has a different diameter, and
   the at least one pair of permanent magnets is disposed on a side of an end portion of the sleeve and includes two annular permanent magnets, an outside diameter of one of the two permanent magnets being smaller than an inside diameter of the other, and the two permanent magnets being concentrically coupled to each other by an annular yoke made of a magnetic substance.

2. The pivot assembly bearing device according to claim 1, wherein
   at least one magnet of the at least one pair of permanent magnets is magnetized in the axial direction.

3. The pivot assembly bearing device according to claim 1, wherein
   at least one magnet of the at least one pair of permanent magnets is fitted to at least the sleeve or the shaft.

4. A magnetic head actuator comprising:
   the pivot head assembly bearing device according to claim 1,
   wherein the pivot head assembly bearing device is further configured to rotatably support a swing arm provided with a magnetic head at a distal end portion.

* * * * *